United States Patent [19]
West

[11] Patent Number: 5,957,375
[45] Date of Patent: Sep. 28, 1999

[54] SUNLOAD SENSOR FOR AUTOMATIC CLIMATE CONTROL SYSTEMS

[75] Inventor: Christopher G. West, Troy, Mich.

[73] Assignee: Eaton Corporation, Cleveland, Ohio

[21] Appl. No.: 08/741,331

[22] Filed: Oct. 28, 1996

[51] Int. Cl.$^6$ .............................. G01B 11/26; G01C 1/00
[52] U.S. Cl. ................................. 236/91 C; 73/DIG. 11; 126/578; 250/203.4; 356/139.01
[58] Field of Search .......................... 236/91 C; 126/573, 126/578; 250/203.4; 356/139.01; 73/DIG. 11

[56] References Cited

U.S. PATENT DOCUMENTS

| | | | |
|---|---|---|---|
| 3,292,050 | 12/1966 | Grossoehme | 165/80.3 |
| 3,768,059 | 10/1973 | Day | 338/25 |
| 4,441,405 | 4/1984 | Takeuchi | 374/29 |
| 4,442,801 | 4/1984 | Glynn et al. | 123/3 |
| 4,491,727 | 1/1985 | Appelbaum et al. | 250/203 |
| 4,495,408 | 1/1985 | Mori | 126/425 X |
| 4,629,941 | 12/1986 | Ellis et al. | 315/153 |
| 4,890,460 | 1/1990 | Takasi et al. | 62/180 |
| 5,065,015 | 11/1991 | Horiguchi et al. | 250/237 R |
| 5,072,106 | 12/1991 | Osawa | 250/206.1 |
| 5,117,643 | 6/1992 | Sakurai et al. | 62/133 |
| 5,117,744 | 6/1992 | Zimmer et al. | 236/91 C X |
| 5,153,429 | 10/1992 | Takahashi | 250/239 |
| 5,165,595 | 11/1992 | Horio et al. | 236/49.3 |
| 5,209,079 | 5/1993 | Kajino et al. | 62/180 |
| 5,298,732 | 3/1994 | Chen | 250/203.4 |
| 5,337,802 | 8/1994 | Kajino et al. | 454/75 X |
| 5,340,021 | 8/1994 | Kajino et al. | 236/49.3 |
| 5,344,070 | 9/1994 | Akasaka et al. | 236/49.3 |
| 5,553,775 | 9/1996 | Kato et al. | 236/91 C |

*Primary Examiner*—William Wayner
*Attorney, Agent, or Firm*—Roger A. Johnston

[57] ABSTRACT

A dual zone climate control system having a sensor capable of sensing solar radiation or sunload entering different localized areas of a vehicle cabin incorporated with a climate control unit for selectively distributing air to localized areas of the vehicle cabin. The climate control unit being controlled by a control unit which processes input received from the sensor and other settings, and controls the temperature and distribution of the air therefrom.

12 Claims, 4 Drawing Sheets

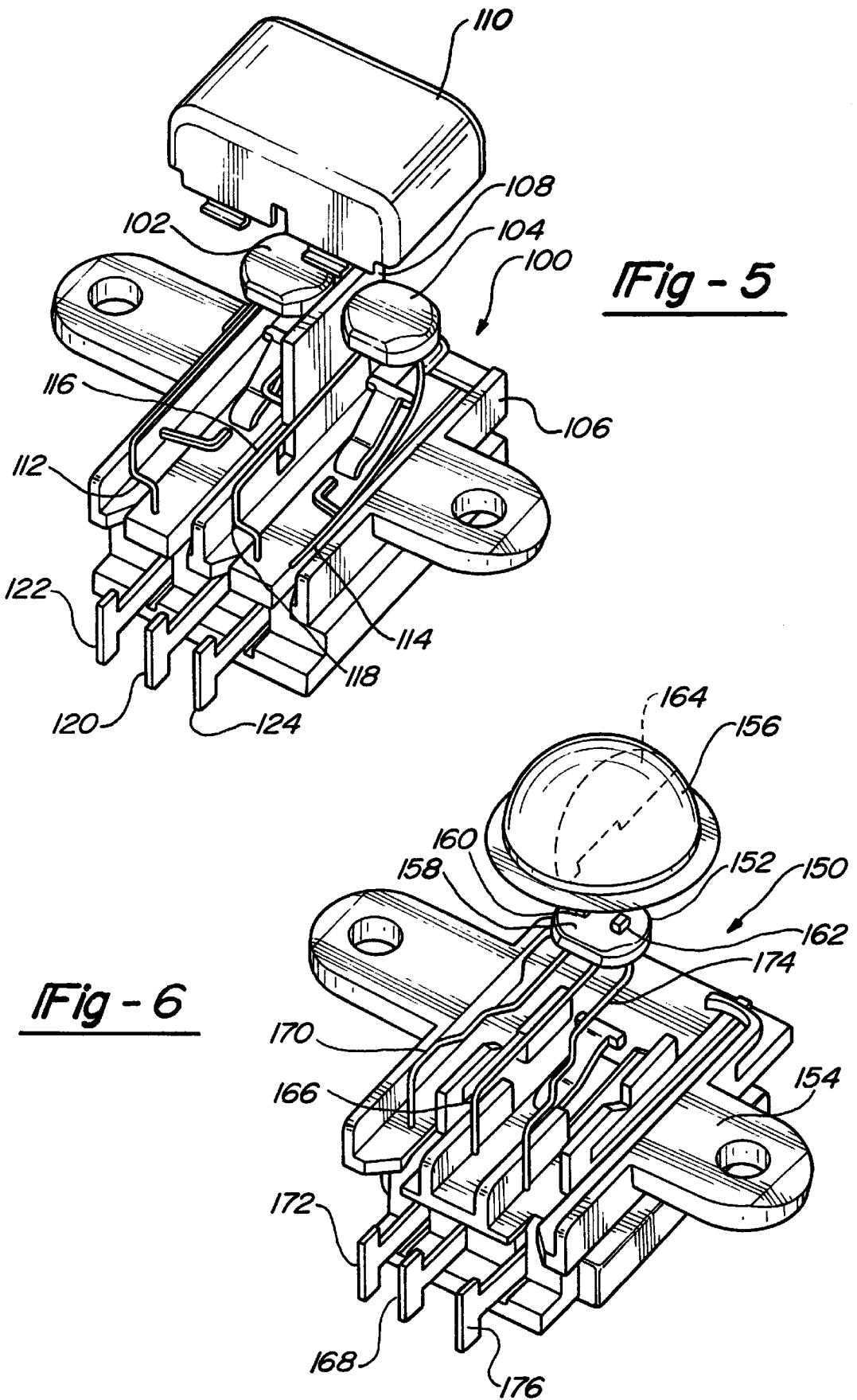

SUNLOAD SENSOR FOR AUTOMATIC CLIMATE CONTROL SYSTEMS

FIELD OF THE INVENTION

The present invention relates to a dual zone sunload sensor for use in a vehicle automatic climate control system, and more particularly, to a sunload sensor capable of detecting and compensating for differences in solar radiation between localized portions of the interior of a vehicle cabin.

BACKGROUND OF THE INVENTION

A number of vehicle manufacturers have attempted to integrate dual automatic climate control systems into their products to provide improved cabin temperature stability and increased comfort to vehicle passengers. Many of these attempts have sought to include solar radiation sensing or detection components for use with automotive air conditioning systems. For example, there have been proposed control systems comprising a plurality of solar radiation or sunload sensors disposed at predetermined portions of the interior of a vehicle cabin, such as front and rear portions of the cabin, in an effort to adequately control the air temperature of the front or rear portion depending upon signals output from the respective sensors. However, these prior efforts often employ a cumbersome increase in the number of parts required, and necessitate a more complex signal processing system. Moreover, the sunload and solar radiation sensors and systems utilized in these prior attempts generally calculate an overall resultant sunload or solar radiation value based upon input from the respective sensors. This resultant value then serves as the basis for implementing temperature changes by the climate control unit. Thus, the systems utilized in these prior efforts generally operate on an overall vehicle cabin level in that the climate control unit responds by effectuating temperature changes to the entire vehicle cabin.

These type of sensors do not fully respond to the particular sunload levels which reach specific localized portions of the vehicle interior. For example, since temperature changes are adjusted on an overall level with respect to the vehicle cabin, the previous systems do not provide any sort of compensation for differing localized sunloads reaching the vehicle interior, such as the driver and passenger sides of a conventional automotive vehicle. Hence, using the presently available systems, a driver and/or passenger of a vehicle are deprived of individualized automatic climate control in response to particular sunloads which reach their respective localized portions of the vehicle interior.

SUMMARY OF THE INVENTION

Accordingly, it is a primary object of the present invention to provide a dual zone climate control system having a sensor capable of sensing solar radiation entering different localized areas of a vehicle cabin incorporated with a climate control unit for selectively distributing air to localized areas of the vehicle cabin. The climate control unit being controlled by a control unit which processes input received from the sensor and controls the temperature and distribution of the air therefrom.

This and other objects, features, and advantages of the present invention will become apparent from a reading of the following detailed description of the preferred embodiments when taken in conjunction with the accompanying drawings and appended claims.

BRIEF DESCRIPTION OF THE DRAWINGS

FIG. 5 is an exploded view of an alternate preferred embodiment of the sensor utilized in the present invention;

FIG. 6 is an exploded view of an alternate preferred embodiment of the sensor utilized in the present invention;

DETAILED DESCRIPTION OF THE INVENTION

In general, the present invention is directed to a dual zone sunload sensor for detecting quantities of solar radiation or sunload entering localized portions of a vehicle cabin. The sunload sensor of the present invention is used in conjunction with an automatic climate control unit to provide a comfortable temperature environment for passengers within the vehicle cabin.

Figure 1:
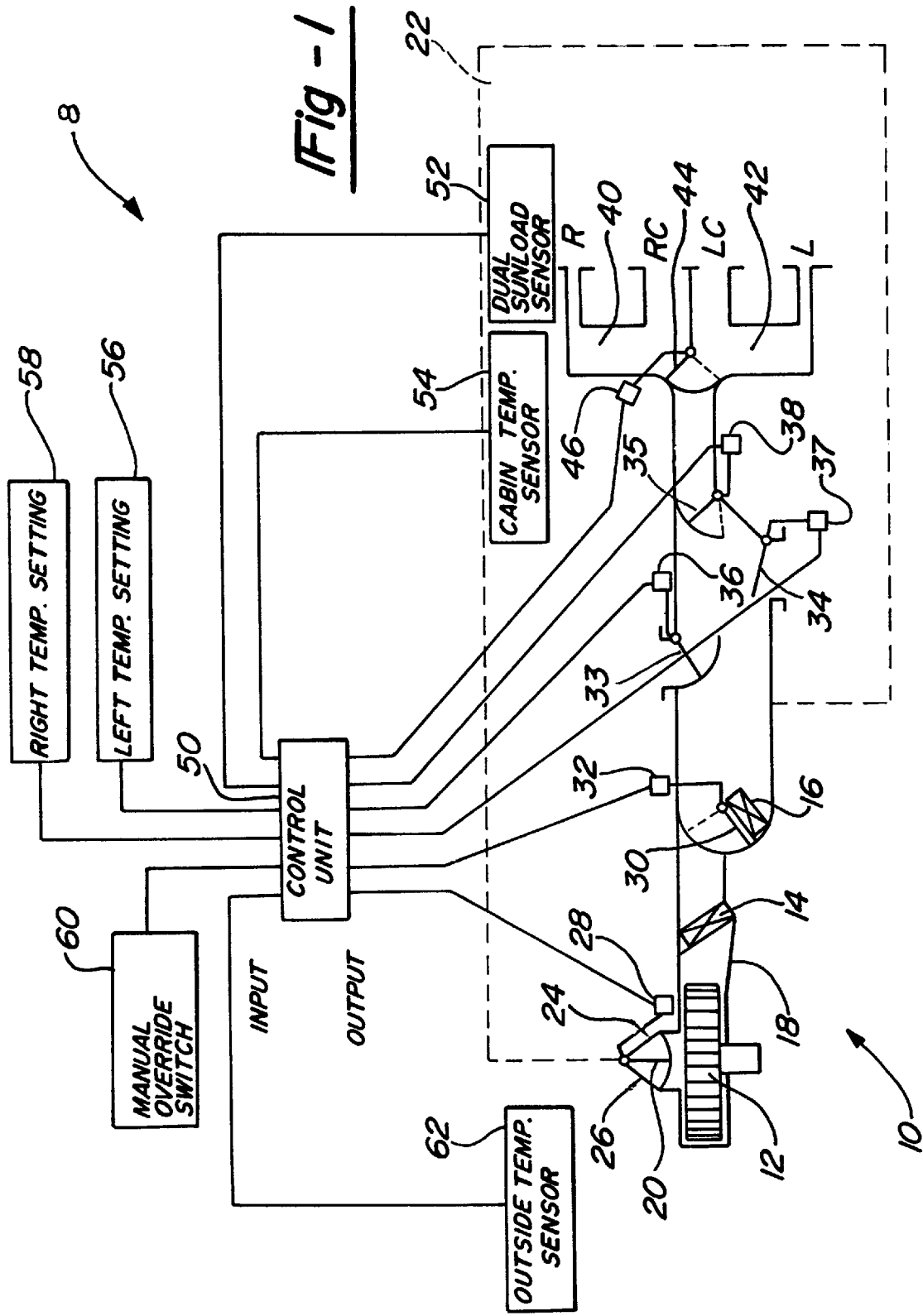
FIG. 1 is a diagrammatic view of the dual zone climate control system of the present invention.

FIG. 1 diagrammatically depicts a preferred embodiment of the Dual Zone Climate Control System of the present invention, generally at reference numeral 8, including a climate control unit indicated by reference number 10. Climate control unit 10 generally consists of a blower 12, an air conditioning evaporator core 14, a heater core 16, a housing 18, and several air ducts and outlets (which will be described in detail below). Further included within unit 10 is a selector door 20 for directing whether air is recirculated within vehicle cabin 22 by drawing air in through cabin air inlet 24, or is drawn from outside of vehicle cabin 22 through outside air inlet 26. The position of selector door 20 is controlled by selector door actuator 28. The air which is drawn in is forced by blower 12 through evaporator core 14 and continues downstream toward air-mix door 30. Air-mix door 30 directs all, some, or none of the air flowing through evaporator core 14 through heater core 16, depending upon the position of air-mix door 30. The position of air-mix door 30 is controlled by air-mix door actuator 32. The portion of air directed through heater core 16 is determined by the air temperature setting selected by the occupants of vehicle cabin 22.

Once the air within housing 18 is at an appropriate temperature, a series of mode doors (33, 34, and 35) direct the air within cabin 22 as selected by the vehicle operator. Defroster mode door 33 is controlled by defroster mode door actuator 36 and determines the portion of air which is directed toward the base of the windshield and side glass to assist in clearing any frost or mist which may have accumulated on the windows due to temperature differences between the interior and exterior of the vehicle cabin. Floor mode door 34 is controlled by floor mode door actuator 37 and controls the amount of air flow directed toward the lower portion of vehicle cabin 22. Similarly, instrument panel mode door 35 is controlled by instrument panel mode door actuator 38 and controls the amount of air flow directed to flow through the right-hand air ducts 40 and the left-hand air ducts 42 collectively.

The final air flow control door within climate control unit 10 is the air distribution door 44, the position of which is controlled by air distribution door actuator 46. Air distribution door 44 controls the portion of air which is directed toward either the right-hand air ducts 40 or the left-hand air ducts 42 depending on the temperature set by the cabin occupants and the sunload distribution experienced on the right-hand and left-hand sides of vehicle cabin 22.

In order to control the temperature, amount, and direction of air-flow within unit 10, a control unit 50 coordinates the positions of doors 20, 30, 33, 34, 35, and 44 by controlling the actuators 28, 32, 36, 37, 38, and 46, respectively, as well as controlling blower 12. Control unit 50 generally includes a processor means which can receive and manipulate the input signals received from the dual zone sunload sensor 52, cabin temperature sensor 54, left side temperature setting 56, right side temperature setting 58, manual override switch 60, and an outside temperature sensor 62. Control unit 50 takes each input signal and maps it to determine the appropriate position for each actuator. Of particular interest to the present invention is the input signal received from the dual zone sunload sensor 52 and the position of air distribution door 44 which is controlled by actuator 46.

Figure 2:
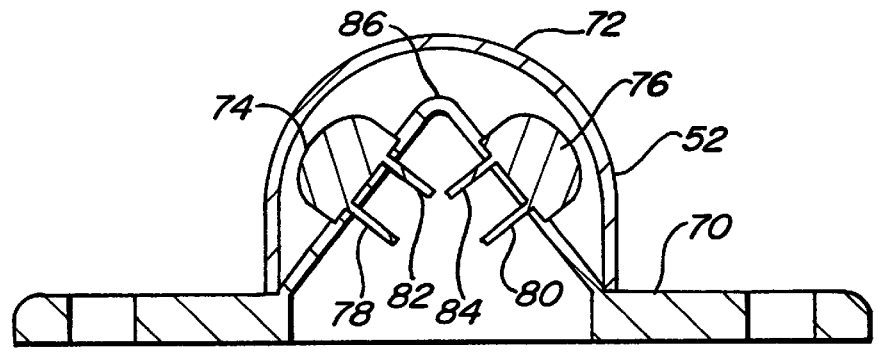
FIG. 2 is a sectional view of a preferred embodiment of the sensor utilized in the climate control system shown in FIG. 1.

With reference to FIG. 2, a preferred embodiment of the dual zone sunload sensor 52 is shown in cross-sectional view. Sensor 52 generally includes a housing 70, a lens 72, a left side photodiode 74, and a right side photodiode 76. Photodiodes 74 and 76 are light-sensitive components which are intended to include any of the many known or later discovered photovoltaic effect producing devices which generate a current, a voltage, or both when exposed to and upon absorption of radiant energy such as sunlight.

In the preferred embodiment, photodiodes 74 and 76 generally provide an output of 450 to 650 microamps and may be, but need not be, matched to one another. It is contemplated by the present invention that photodiodes of greater or lesser range of amperage outputs can be utilized depending upon the needs of the user and conditions under which the sensor is to be utilized. Left side photodiode 74 and right side photodiode 76 each have an anode lead (78 and 80 respectively) and a cathode lead (82 and 84 respectively) with cathode leads 82 and 84 being attached to a common terminal (not shown) such that a three lead connector can be utilized.

Left side photodiode 74 and right side photodiode 76 are mounted on a central portion 86 of housing 70. Central portion 86 is formed in a generally triangular shape such that the included angle between photodiode 74 and photodiode 76 is typically between 50 and 90 degrees. Photodiodes 74 and 76 are generally directed toward the left and right side, respectively, of vehicle cabin 22. Lens 72 is generally arcuate-shaped and is mounted to housing 70 such that photodiodes 74 and 76 are contained between housing 70 and lens 72.

Figure 3:
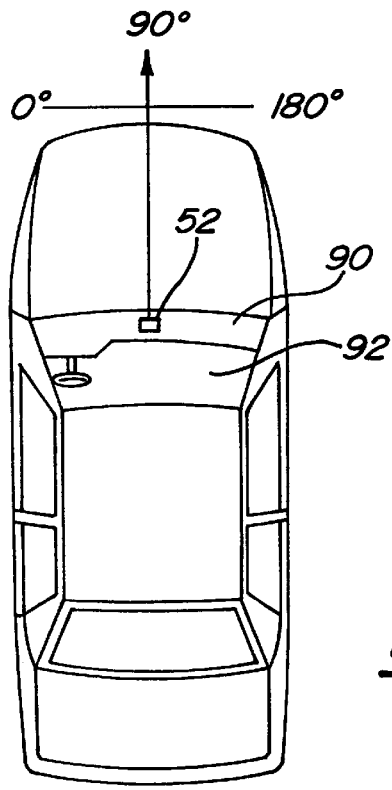
FIG. 3 is a plan view of a vehicle incorporating the dual zone climate control system of the present invention.

Dual zone sunload sensor 52 is generally mounted to the central portion of an instrument panel 90 such that it is exposed to sunlight projecting through windshield 92 as shown in FIG. 3. As shown, the vehicle of FIG. 3 is positioned facing north with the passenger or right-hand side being exposed to the east and the driver or left-hand side being exposed to the west.

Figure 4:
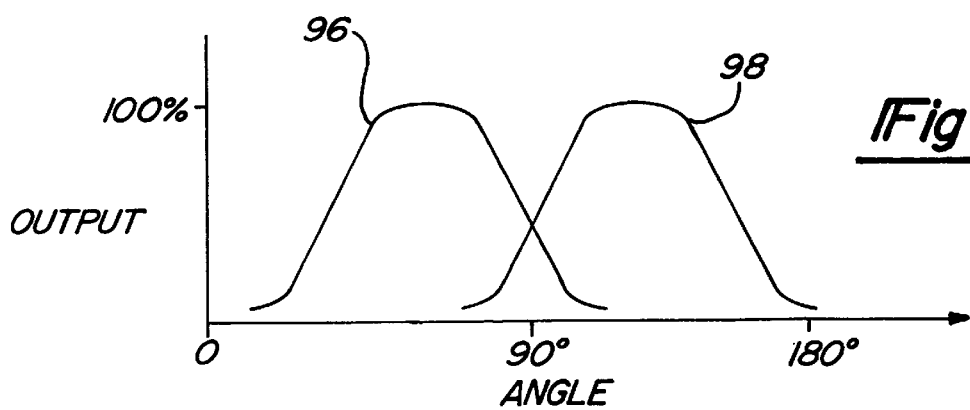
FIG. 4 is graphic representation of the output signals produced by the sensor of the present invention.

With reference to FIG. 4, there is shown a pair of generally sinusoid shaped output signal curves, the first curve 96 corresponding to the output signal produced by left side photodiode 74, and the second curve 98 corresponding to the output signal produced by right side photodiode 76. As the sun rises in the east, represented by the 180° mark in FIGS. 3 and 4, the radiant sunload experienced on the passenger side of the vehicle is slightly greater than that to which the driver side of the vehicle is exposed. As the azimuth of the sun rises, the radiant sunload which the passenger side of the vehicle is exposed to in relation to that which the driver side is exposed to increases and reaches its peak at approximately 135°. Corresponding to this increase in sunload experienced by the passenger side of the vehicle, the output signal of second curve 98 increases as the azimuth of the sun moves from 180° to the 135° range. This would generally correspond to the condition experienced from sunrise until approximately 10:00 a.m., but would vary depending on the season and the geographic location of the vehicle. As the sun continues to rise, and progresses from the 135° azimuth toward the 90° azimuth, the radiant sunload experienced by the passenger side of the vehicle begins to diminish in comparison to the driver side of the vehicle as the driver side begins to experience an increase in radiant sunload. Again, the output signals depicted in FIG. 4 correspond to this change as shown by the decrease in output signal of second curve 98 with a generally proportional increase in the output signal of first curve 96. When the sun is at a 90° azimuth above the vehicle, the output signals represented by first curve 96 and second curve 98 are generally equal to one another since the radiant sunload which the vehicle is exposed to is generally uniform across the vehicle from right to left. This is the condition which would generally be expected at approximately 12:00 noon.

As the sun continues to move westward, the radiant sunload experienced by the driver side of the vehicle shown in FIG. 3 increases in relation to that of the sunload experienced by the passenger side of the vehicle. As shown in FIG. 4, first curve 96 increases the output signal as the azimuth of the sun progresses from a 90° azimuth to a 45° azimuth, while the output signal from the second curve 98 decreases during this same range of angles. The 45° azimuth generally corresponds to the position of the sun at approximately 2:00 p.m. As the sun continues even further westward, the sunload experienced by the driver side of the vehicle continues to decrease until the sun sets, this decrease being depicted by the decreasing output signal of first curve 96 as it approaches the 0° mark.

Control unit 50 receives the output signal from left side photodiode 74 and right side photodiode 76 as an input signal and maps that signal, along with the additional signals which are sent by the additional settings or sensors, and therefore controls actuator 46 to position air distribution door 44. When the output signal received from right side photodiode 76 is greater than that received from left side photodiode 74, the control unit will generally position air distribution door 44, via actuator 46, in a leftward position such that a greater portion of air flows to right-hand air ducts 40 when compared to that flowing to left-hand air ducts 42. This additional flow of air through right-hand air ducts 40 will cool the right-hand portion of the vehicle cabin 22 to a greater extent than the left-hand portion of cabin 22.

The opposite is also true, when the output signal received from left side photodiode 74 is greater than that received from right side photodiode 76, the control unit will generally position air distribution door 44 in a rightward position such that a greater portion of air flows to left-hand air ducts 42 when compared to that flowing to right-hand air ducts 40, therefore cooling the left-hand portion of vehicle cabin 22 to a greater extent than the right-hand portion of cabin 22.

Referring now to FIG. 5, there is shown an exploded view of an alternate preferred embodiment of the dual zone sun load sensor, generally indicated by the reference numeral 100. Sensor 100 generally includes a left side photodiode 102 and a right side photodiode 104 which are mounted to a housing 106 in a generally planar fashion. A partition wall 108 is formed within housing 106 such that left side photodiode 102 and right side photodiode 104 are positioned on opposite sides of wall 108. A lens 110 is positioned over photodiodes 102 and 104 and is attached to housing 106 such that the lens 110 and partition wall 108 coordinate to separate the photodiodes 102 and 104 and produce the right to left response output as previously shown in FIG. 4.

Photodiodes 102 and 104 each have an output range from approximately 450 to 650 microamps in the preferred embodiment shown in FIG. 5. Left and right side photodiodes 102 and 104 each have an anode lead 112 and 114, respectively, and a cathode lead 116 and 118, respectively. Cathode leads 116 and 118 being connected to a common terminal 120. The left side anode lead 112 is connected to left side terminal 122 and the right side anode lead 114 is connected to a right side terminal 124.

Referring now to FIG. 6, there is shown an exploded view of an alternate preferred embodiment of dual zone sunload sensor generally represented by the reference numeral 150. Sensor 150 generally includes one photodiode 152 which is mounted to housing 154 and covered by lens 156. Photodiode 152 generally consists of one ceramic header 158 having a left photodiode die 160 and a right photodiode die 162 mounted therein. Photodiode 152 is mounted in a generally planar position relative to housing 154 and a partition wall 164, incorporated within lens 156, provides the necessary right to left response of each of the dies 160 and 162. Each photodiode die 160 and 162 has an output range of between 450 and 650 microamps and an output signal pattern as represented previously in FIG. 4. There is a single common cathode lead 166 coming from photodiode 152. Cathode lead 166 communicates with both left photodiode die 160 and right photodiode die 162 and is connected to a common terminal 168. A separate left photodiode die anode lead 170 is connected to a left side terminal 172, and a right photodiode die anode lead 174 is connected to a right side terminal 176.

Figure 7:
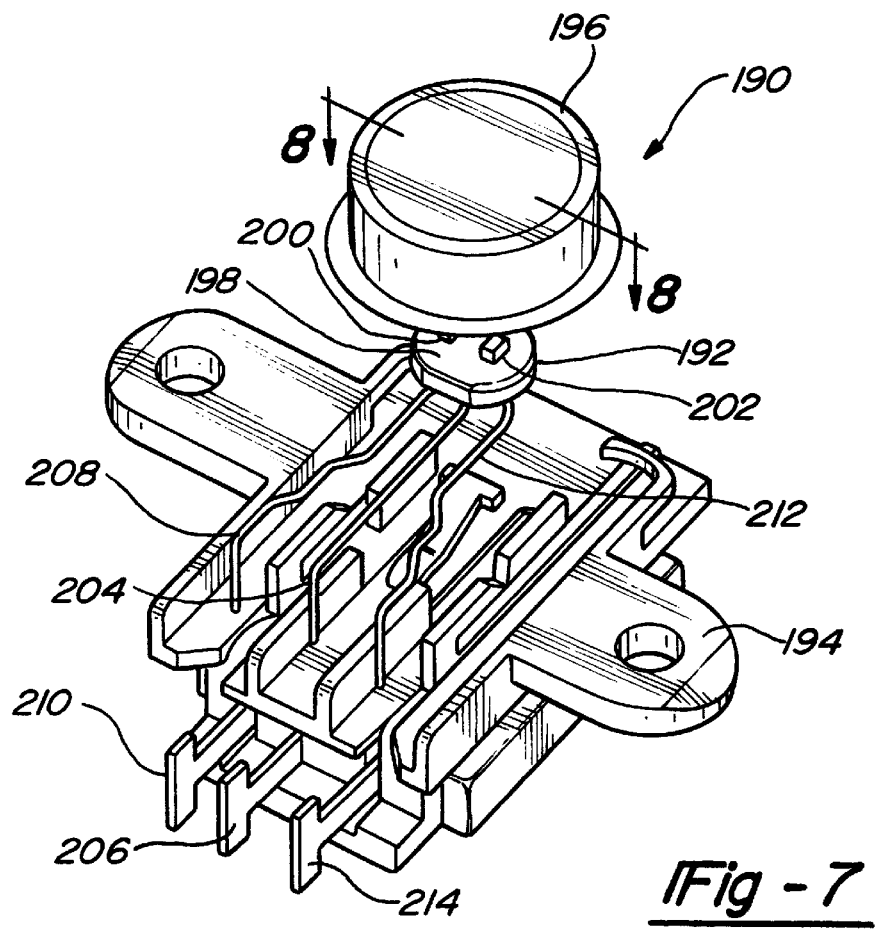
FIG. 7 is an exploded view, of another alternate preferred embodiment of the sensor utilized in the present invention.

Referring now to FIG. 7, there is shown an exploded view of a further preferred embodiment of the dual zone sunload sensor generally represented by the reference number 190. Sensor 190 generally includes a single photodiode 192 mounted to housing 194 and covered by lens 196. Photodiode 192 includes a ceramic header 198, a left side photodiode die 200, and a right side photodiode die 202. Photodiode dies 200 and 202 again have a common cathode lead 204 which connects to common terminal 206, a left photodiode die anode lead 208 attached to a left side terminal 210, and a right photodiode die anode lead 212 connected to a right side terminal 214.

Figure 8:
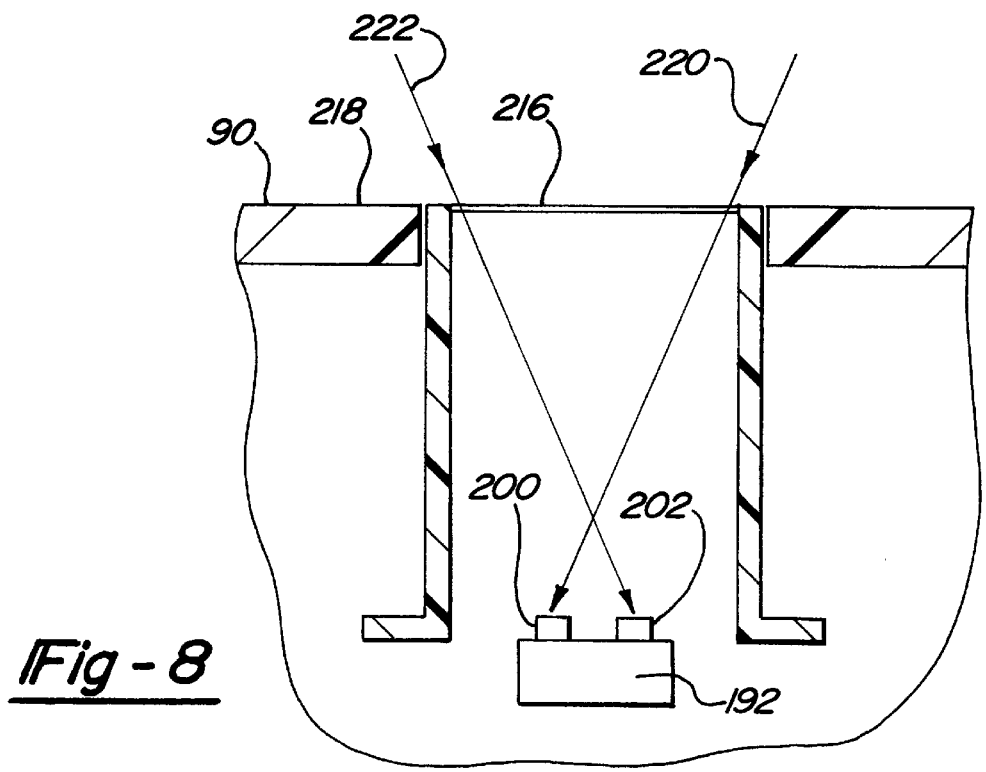
FIG. 8 is a partial sectional view of the sensor shown in FIG. 7, taken substantially along line 8—8, and shown in its mounted environment.

As shown in FIG. 8, a partial cross sectional view taken along line 8—8 in FIG. 7, photodiode 192 is positioned a known distance below a top surface 216 of lens 196. Top surface 216 is positioned so that it is generally coincident with an outer surface 218 of instrument panel 90 (shown in FIG. 3) such that when the azimuth of the sun is generally in the east the sunload projects onto the left side photodiode die as indicated by light ray 220. The opposite is also true, that being when the sun is in the western portion of the sky, the light ray 222 impinges upon the right side photodiode die 202. Therefore, the output signal created by left side photodiode die 200 would correspond to the second curve 98 of FIG. 4 and the output signal from the right side photodiode die 202 would correspond to the first curve 96 in FIG. 4.

The foregoing discussion discloses and describes several exemplary embodiments of the present invention. One skilled in the art will readily recognize from such discussion, and from the accompanying drawings and claims, that various changes, modifications, and variations can be made therein without departing from the true spirit and fair scope of the invention as defined in the following claims.

What is claimed is:

1. A dual zone sunload sensor for sensing radiant energy, said sensor comprising:

a sensor housing;

a lens attached to said housing so as to be generally coplanar with a top surface of said housing;

a sensor element including a first sensor and a second sensor having a common cathode, said sensing element being covered by and positioned a distance below said lens such that said housing extends circumferentially around said sensor element to block radiant energy transmitted in a first angular orientation from said second sensor and to further block radiant energy transmitted in a second angular orientation from said first sensor.

2. The sensor of claim 1 wherein said housing further comprises a panel having an aperture found therein and a wall portion extending downwardly from said panel.

3. The sensor of claim 1 wherein said first and second sensors are photovoltaic cells.

4. The sensor of claim 3 wherein said photovoltaic cells produce an electrical current as an output signal when the cells are exposed to radiant energy.

5. The sensor of claim 3 wherein said photovoltaic cells produce an electrical voltage as an output signal when the cells are exposed to radiant energy.

6. The sensor of claim 1 wherein said first and second sensors have a common cathode.

7. A dual zone sunload sensor for sensing radiant energy entering a vehicle cabin, said sensor comprising:

a sensor including a first light sensitive component and a second light sensitive component having a common cathode with said first light sensitive component;

a lens covering said sensor; and a housing adapted for fixed placement within said vehicle cabin and extending downwardly from said lens such that said first and second light sensitive components are positioned a distance below said lens, said housing extending circumferentially around said first and second light sensitive components to block said radiant energy entering said first side of said vehicle from said second light sensing component and to further block said radiant energy entering said second side of said vehicle said first sensing portion such that radiant energy entering from a first side of said vehicle cabin causes said first component to produce a first output signal generally proportional to said radiant energy said first component is exposed thereto, and said second component being disposed such that radiant energy entering from a second side of said vehicle cabin causes said second component to produce a second output signal generally proportional to said radiant energy said second component is exposed thereto.

8. The sensor of claim 7, wherein said first and second light sensitive components are photovoltaic cells.

9. The sensor of claim 8 wherein said photovoltaic cells produce an electrical current as an output signal when said cells are exposed to said radiant energy.

10. The sensor of claim 8 wherein said photovoltaic cells produce an electrical voltage as an output signal when said cells are exposed to said radiant energy.

11. A dual zone sunload sensor for sensing radiant energy an said sensor comprising:

a sensing element having a ceramic header including a first sensing portion having a first photodiode die disposed thereon for generating a first output signal which is proportional to the radiant energy impinging thereupon, a second sensing portion having a second photodiode die disposed on said second sensing portion for generating a second output signal which is proportional to the radiant energy impinging thereupon;

a lens covering said sensing element; and a sensor housing extending downwardly from said lens and circumferentially around said sensing element such that said ceramic header is positioned a distance below said lens and said sensor housing blocks radiant energy transmitted in a first angular orientation from said first photodiode die and further blocks radiant energy transmitted in a second angular orientation from said second photodiode die.

12. The sensor of claim 11 further comprising a common cathode operably connected between said ceramic header and said first and second photodiode dies to produce said first and second output signals, respectively.

* * * * *